(12) United States Patent
Bacarella et al.

(10) Patent No.: US 6,593,561 B2
(45) Date of Patent: Jul. 15, 2003

(54) METHOD AND SYSTEM FOR GATHERING IMAGE DATA USING MULTIPLE SENSORS

(75) Inventors: Antonio V. Bacarella, Dallas, TX (US); Timothy E. Ostromek, Richardson, TX (US)

(73) Assignee: Litton Systems, Inc., Woodland Hills, CA (US)

( * ) Notice: Subject to any disclaimer, the term of this patent is extended or adjusted under 35 U.S.C. 154(b) by 137 days.

(21) Appl. No.: 09/888,133

(22) Filed: Jun. 22, 2001

(65) Prior Publication Data

US 2002/0195561 A1 Dec. 26, 2002

(51) Int. Cl.$^7$ ............................................. H01J 40/14
(52) U.S. Cl. .................................... 250/208.1; 250/221
(58) Field of Search ............................ 250/208.1, 221, 250/222.1, 239, 214 VT, 330; 359/850, 858

(56) References Cited

U.S. PATENT DOCUMENTS 4,967,069 A   10/1990   Yamakawa .................. 250/221
5,729,376 A   3/1998    Hall et al. .................. 359/366
6,448,544 B1 * 9/2002   Stantone et al. ......... 250/208.1

OTHER PUBLICATIONS

PCT International Search Report in International Application No. PCT/US02/17366, dated Sep. 27, 2002, 4 pages.

* cited by examiner

Primary Examiner—Kevin Pyo
(74) Attorney, Agent, or Firm—Baker Botts L.L.P.

(57) ABSTRACT

A system and method for gathering image data are disclosed. A first sensor (120) receives light directly from an aperture (114) and generates a first data set in response to the received light. A first reflective surface (130) receives light from the aperture (114) and reflects the received light. A second reflective surface (132) receives light reflected from the first reflective surface (130) and reflects the received light. A second sensor (134) receives light reflected from the second reflective surface (132) and generates a second data set in response to the received light. The second sensor (134) is substantially coaxial with the first sensor (120).

25 Claims, 2 Drawing Sheets

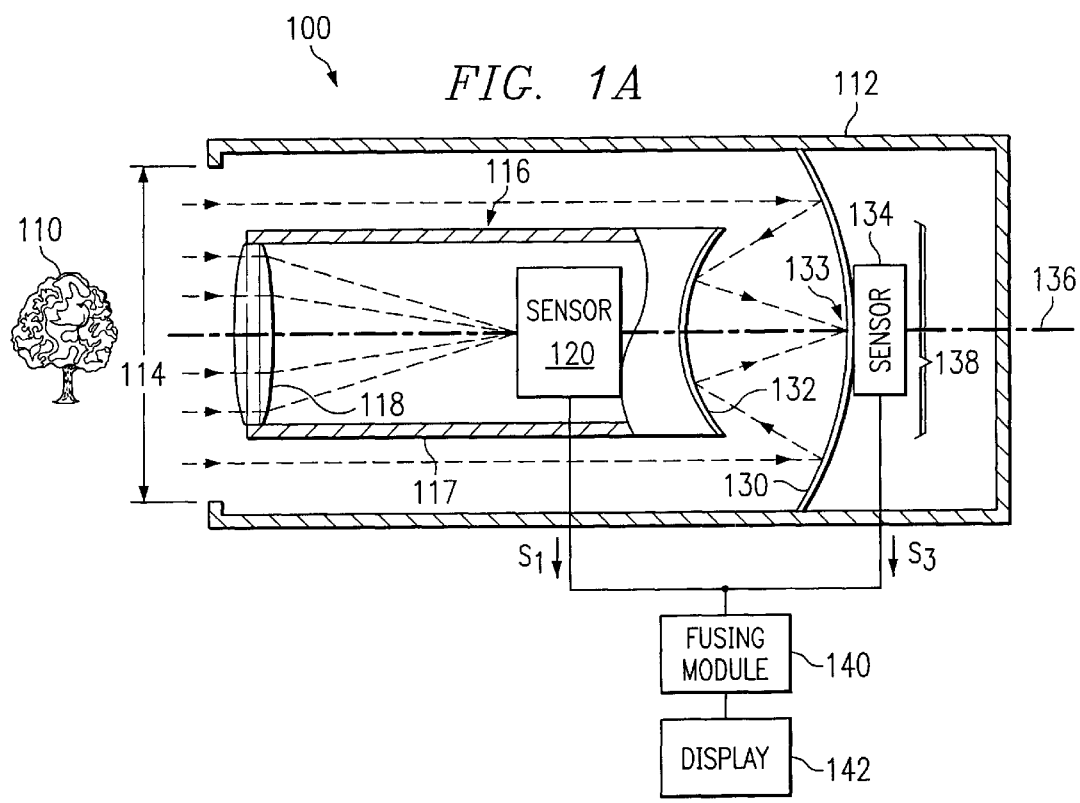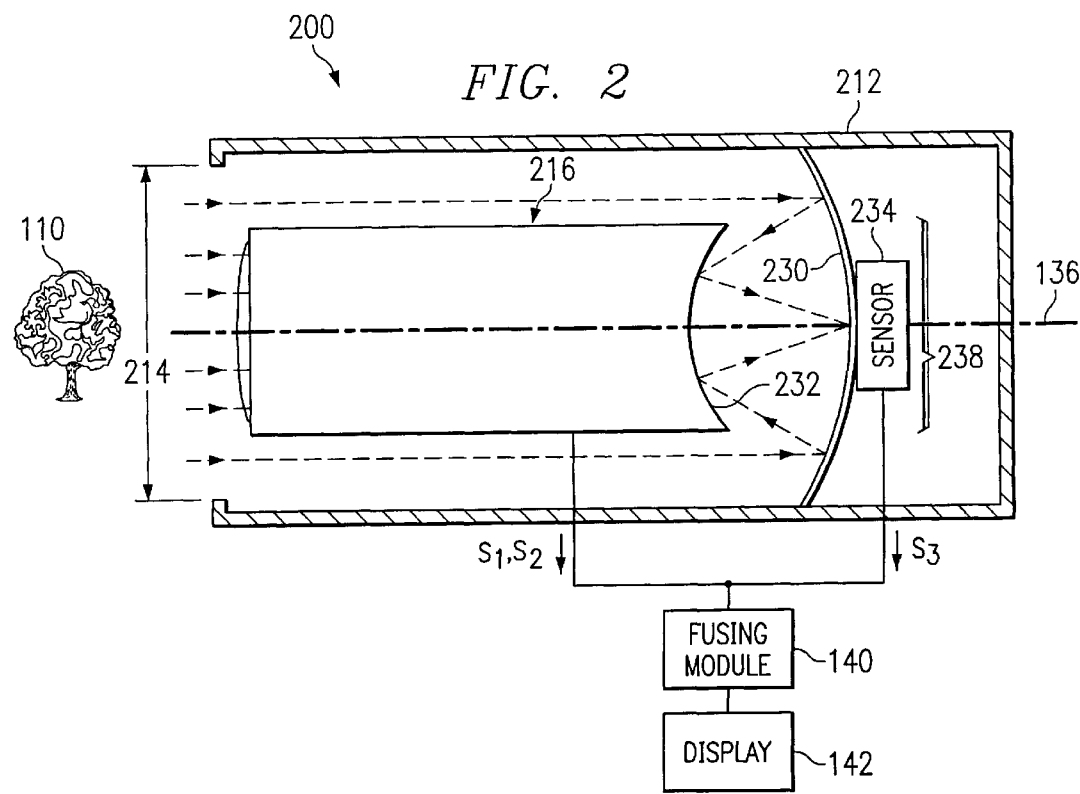

METHOD AND SYSTEM FOR GATHERING IMAGE DATA USING MULTIPLE SENSORS

TECHNICAL FIELD OF THE INVENTION

This invention relates generally to the field of imaging systems and more specifically to a method and system for gathering image data using multiple sensors.

BACKGROUND OF THE INVENTION

Multiple sensor imaging systems generate an image of an object by fusing data that is collected using multiple sensors. Gathering image data using multiple sensors, however, has posed challenges. In some systems, the sensors detect light received from separate apertures. Data generated from light from separate apertures, however, describe different points of view of an object that need to be reconciled in order to fuse the data into a single image. Additionally, using separate apertures for different sensors may increase the bulk of an imaging system.

In other systems, light from an aperture is split into components before entering the sensors. Reflective and refractive elements are typically used to direct the light to different sensors. For example, the system described in U.S. Pat. No. 5,729,376 to Hall et al. includes multiple reflective and refractive elements such as a lens that reflects light towards one sensor and refracts light towards another sensor. Each individual sensor, however, detects only a component of light, for example, only specific wavelengths of light, and thus cannot generate image data from the full spectrum. Additionally, multiple reflective and refractive elements may add to the bulk and weight of an imaging system. Consequently, gathering image data from multiple sensors has posed challenges for the design of imaging systems.

SUMMARY OF THE INVENTION

While known approaches have provided improvements over prior approaches, the challenges in the field of imaging systems have continued to increase with demands for more and better techniques having greater effectiveness. Therefore, a need has arisen for a new method and system for gathering image data using multiple sensors.

In accordance with the present invention, a method and system for gathering image data multiple sensors are provided that substantially eliminate or reduce the disadvantages and problems associated with previously developed systems and methods.

According to one embodiment of the present invention, a system for gathering image data is disclosed. The system includes a casing with an aperture. A first sensor receives light directly from the aperture and generates a first data set in response to the received light. A first reflective surface receives light from the aperture and reflects the received light. A second reflective surface receives light reflected from the first reflective surface and reflects the received light. A second sensor receives light reflected from the second reflective surface and generates a second data set in response to the received light. The second sensor is substantially coaxial with the first sensor.

According to another embodiment of the present invention, a method for gathering image data is disclosed. Light is received directly through an aperture. A first data set is generated in response to the light received through the aperture using a first sensor. The light received through the aperture is reflected using a first reflective surface. The light received from the first reflective surface is reflected using a second reflective surface. The light reflected from the second reflective surface is received by a second sensor, where the second sensor is substantially coaxial with the first sensor. A second data set is generated in response to the received light using the second sensor.

According to another embodiment of the present invention, a system for gathering image data. The system includes a casing having an aperture. An inner sensor receives light directly from the aperture and generates a first data set in response to the received light. Outer assemblies are coupled to the casing. Each outer assembly includes: a first reflective surface that receives light directly from the aperture and reflects the received light; a second reflective surface that receives light reflected from the first reflective surface and reflects the received light; and an outer sensor that receives light reflected from the second reflective surface and generates a second data set in response to the received light, where the outer sensor is substantially coaxial with the inner sensor.

Embodiments of the invention may provide numerous technical advantages. A technical advantage of one embodiment is that multiple sensors receive light from the same aperture. The sensors detect light describing the same point of view of an object, resulting in data that may be more readily fused. Another technical advantage of one embodiment is that the sensors are coaxial, allowing for a more compact system. Another technical advantage of one embodiment is that each sensor may detect the full spectrum of light, allowing for improved datasets. Consequently, embodiments of the present invention provide a system and method for gathering image data from multiple sensors in an effective and compact manner.

Other technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which:

FIGS. 1A and 1B illustrate one embodiment of a system for gathering image data that may be used in accordance with the present invention;

FIG. 2 illustrates one embodiment of a system for gathering image data that includes three or more sensors.

DETAILED DESCRIPTION OF THE DRAWINGS

Embodiments of the present invention and its advantages are best understood by referring to FIGS. 1 and 2 of the drawings, like numerals being used for like and corresponding parts of the various drawings.

Figure 1B:
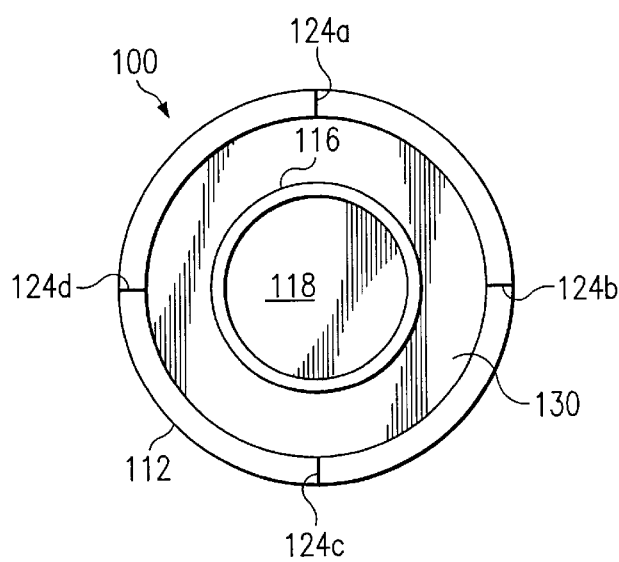

FIG. 1A illustrates a side view of one embodiment of a system 100 for gathering image data according to the present invention. System 100 receives light reflected from an object 110 and gathers information from the light to generate an image of object 110 on a display 142. System 100 may include an outer casing 112 having an aperture 114 through which light enters. Outer casing 112 may have any suitable shape such as a cylinder having a diameter in the range of 8–12 cm, for example, approximately 10 cm, and a length in the range of 12–15 cm, for example, approximately 14 cm. System 100 may also include an inner assembly 116 coupled to outer casing 112 with braces 124 as illustrated in FIG. 1B. FIG. 1B illustrates a front view of inner assembly 116 coupled to casing 112 with braces 124.

Referring back to FIG. 1A, inner assembly 116 may include optics 118 and a sensor 120, each of which may be coupled to an inner casing 117. Inner casing 117 may have any suitable shape such as a cylinder having a diameter in the range of 3 to 6 cm, for example, approximately 4.5 cm, and a length in the range of 7 to 10 cm, for example, approximately 8 cm in length. Optics 118 focuses light reflected from object 110 onto sensor 120. Optics 118 may include, for example, a lens comprising glass or polymer having a radius in the range of 3 to 5 cm, for example, approximately 4 cm, and a focal length in the range of 20–22 mm, for example, approximately 22 mm. Optics 118, however, may include any suitable optical element or configuration of optical elements for focusing light from object 110 onto sensor 120.

Sensor 120 detects the light reflected from object 110 directly through aperture 114, that is, through an uninterrupted pathway. Sensor 120 may be placed such that sensor 120 receives light generally in a direction that light travels from object 110 to aperture 114. Sensor 120 may detect certain types of energy, for example, infrared energy, of the light. Sensor 120 may enhance certain features of light such as, for example, an image intensifier sensor. Sensor 120, however, may comprise any suitable sensor, for example, a long wave infrared sensor, a low light level charge coupled device (LLLCCD), or a complementary metal-oxide semiconductor (CMOS) sensor.

Sensor 120 generates sensor data set $S_1$ in response to the received light. Sensor data set $S_1$ may include values assigned to pixels corresponding to points of light, where the values represent image information such as brightness or color associated with the points of light. Sensor 120 transmits sensor data set $S_1$ to a fusing module 140.

System 100 may also include an outer assembly 138 comprising reflective surfaces 130 and 132 and a sensor 134. Reflective surface 130 and sensor 134 may be coupled to outer casing 112, and reflective surface 132 may be coupled to inner casing 117. Any suitable configuration, however, may be used, for example, outer assembly 138 may be configured as a Schmidt-Cassegran catadioptric optical assembly, a diffractive optical system, or any combination of suitable configurations.

Reflective surface 130 receives light from object 110 through aperture 114 and reflects the received light. Reflective surface 130 may comprise a metallic or dichroic mirror having a diameter in the range of 8 to 10 cm, for example, approximately 9 cm and a focal length in the range of 24 to 26 mm, for example, approximately 25 mm. Reflective surface 130, however, may comprise any material and may have any shape suitable for receiving light through aperture 114 and reflecting light to reflective surface 132. Reflective surface 132 receives light from reflective surface 130 and reflects the received light. Reflective surface 132 may comprise a metallic or dichroic mirror having a diameter in the range of 7 to 10 cm, for example, approximately 8 cm and a focal length in the range of 24 to 26 cm, for example, approximately 25 mm. Reflective surface 132, however, may comprise any material and may have any shape suitable for receiving light from reflective surface 130 and reflecting light to a receptor area 133 of sensor 134.

Receptor area 133 of sensor 134 detects light reflected from reflective surface 132. Sensor 134 may include, for example, an infrared sensor or an image intensifier sensor. Sensor 134, however, may comprise any suitable sensor, for example, a long wave infrared sensor, a medium wave infrared sensor, a short wave infrared sensor, a low light level charge coupled device (LLLCCD), or a complementary metal-oxide semiconductor (CMOS) sensor. Sensor 134 generates sensor data set $S_2$ in response to the received light. Sensor 134 may generate a different type of data set than that generated by sensor 120. For example, sensor 120 may include an infrared sensor that detects infrared energy of received light to generate a data set, and sensor 134 may include an image intensifier sensor that enhances certain features of received light to generate a different type of data set. Sensor data set $S_2$ may include values assigned to pixels corresponding to points of light, where the values represent image information associated with the points of light. Sensor 134 transmits sensor data $S_2$ to fusing module 140.

System 100 may have a central axis 136 located approximately along a light path from object 110 to receptor area 133 of sensor 134. Sensor 120 and sensor 134 may be substantially coaxial such that sensor 120 and sensor 134 receive light at a point approximately along central axis 136. Sensor 120 and sensor 134 may be configured such that the diameter of inner assembly 116 is less than the diameter of reflective surface 130, and inner assembly 116 is approximately centered over reflective surface 130 as illustrated in FIG. 1B. FIG. 1C illustrates a front view of system 100 where inner assembly 116 is approximately centered in front of reflective surface 130. In the illustrated embodiment, the configuration of sensors 120 and 134 allows sensors 120 and 134 to receive light from the same aperture 114 with minimal reflective and refractive elements, providing for a compact imaging system.

Fusing module 140 receives sensor data $S_1$ and $S_2$ from sensors 120 and 134, respectively. Fusing module 140 fuses sensor data sets $S_1$ and $S_2$ to generate fused data. For example, fusing module 140 combines values of sensor data sets $S_1$ and $S_2$ for pixels corresponding to the same point of light to generate the fused data. Fusing module 140 may use any suitable process for fusing data sets $S_1$ and $S_2$, for example, digital imaging processing, optical overlay, or analog video processing.

In the illustrated embodiment, sensor 120 and sensor 134 detect light received through the same aperture 114, so both sensors 120 and 134 receive light describing the same point of view of object 110. As a result, fusing module 140 does not need to perform data processing to reconcile different points of view. Additionally, since minimal reflective and refractive elements are used, the light detected by sensors 120 and 134 undergoes few changes. As a result, fusing module 140 does not need to perform processing to compensate for changes due to multiple reflective and refractive elements.

Display 142 receives the fused data from fusing module 140, and generates an image of object 110 using the fused data. Display 142 may include any suitable system for displaying image data, such as an organic light-emitting diode (OLED), nematic liquid-crystal display (LCD), or field emitting display (FED), in panel display, eyepiece display, or near-to-eye display formats.

Although the illustrated embodiment shows two sensors 120 and 134, the system of the present invention may include any suitable number of sensors, as described in connection with FIG. 2.

FIG. 2 is a block diagram of one embodiment of a system 200 that includes three sensors for gathering image data.

System 200 includes an inner assembly 216 coupled to an outer casing 212. Inner assembly may be substantially similar to system 100 of FIG. 1, which includes two sensors 120 and 134. Outer assembly 238 may be substantially similar to outer assembly 138. That is, reflective surfaces 230 and 232, which may be substantially similar to reflective surfaces 130 and 132, respectively, are coupled to inner assembly 216 and outer casing 212, respectively. Additionally, sensor 234, which may be substantially similar to sensor 134, is coupled to outer casing 212. Sensors 120, 134, and 234 may be substantially coaxial. Fusing module 140 is coupled to sensors 120, 134, and 234, and display 142 is coupled to fusing module 140.

In operation, system 200 receives light reflected from object 110. Inner assembly 216 may generate data sets $S_1$ and $S_2$ in a manner substantially similar to that of system 100 of FIG. 1. Sensor 234 receives light reflected from reflective surfaces 230 and 232 in a substantially similar matter to that of sensor 134 to generate dataset $S_3$. Fusing module 140 receives datasets $S_1$, $S_2$ and $S_3$ and fuses the datasets to generate fused data. Display 142 receives the fused data and generates an image from the fused data. Additional sensors may be added to system 200.

Figure 3:
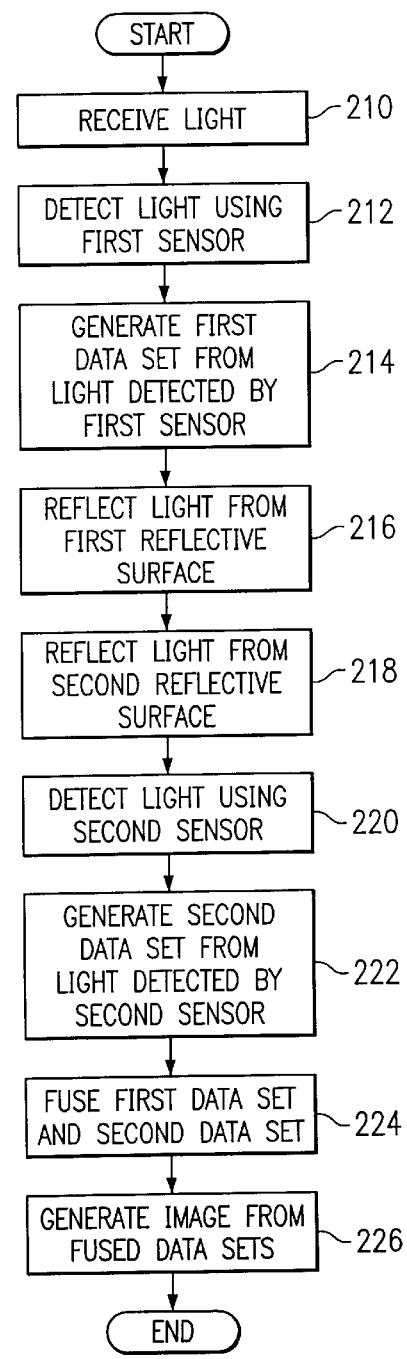
FIG. 3 is a flowchart demonstrating one embodiment of a method that may be used with the system of FIG. 1 in accordance with the present invention.

FIG. 3 is a flowchart illustrating one embodiment of a method for gathering image data using system 100 of FIG. 1. The method begins at step 210, where light reflected from object 110 is received by aperture 114. The reflected light includes image information that may be used to form an image of object 110. At step 212, sensor 120 detects the received light. Optics 118 may be used to focus the light onto sensor 120. Sensor 120 generates a data set $S_1$ from the detected light and transmits data set $S_1$ to fusing module 140 at step 214. Sensor 120 may, for example, detect infrared light reflected from object 110 and generate a data set $S_1$ that describes the infrared light.

At step 216, reflective surface 130 receives light from object 110 and reflects the received light to reflective surface 132. Reflective surface 132 receives the reflected light and, in turn, reflects the received light to sensor 134 at step 218. At step 220, sensor 134 detects light reflected from reflective surface 132. Sensor 134 generates data set $S_2$ from the received light at step 222. Sensor 134 may include an image intensifier sensor that enhances certain features of the light received from object 110, and may generate a data set that describes the enhanced features.

At step 224, fusing module 140 receives data sets $S_1$ and $S_2$ and fuses the received data sets to generate fused data. Fusing module 140 may, for example, combine values from data sets $S_1$ and $S_2$ for pixels corresponding to the same point of light. Display 142 receives the fused data and then displays an image of object 110 at step 226. After displaying the image, the method terminates.

Embodiments of the invention may provide numerous technical advantages. A technical advantage of one embodiment is that multiple sensors 120 and 134 receive light from the same aperture 114. Sensors 120 and 134 detect light describing the same point of view of object 110, resulting in data that may be more readily fused. Another technical advantage of one embodiment is that sensors 120 and 134 are coaxial, allowing for a more compact system. Another technical advantage of one embodiment is that each sensor 120 and 134 may detect the full spectrum of light, allowing for improved datasets. Consequently, embodiments of the present invention provide a system and method for gathering image data from multiple sensors 120 and 134 in an effective and compact manner.

Although an embodiment of the invention and its advantages are described in detail, a person skilled in the art could make various alterations, additions, and omissions without departing from the spirit and scope of the present invention as defined by the appended claims.

What is claimed is:

1. A system for gathering image data, the system comprising:
   a casing having an aperture;
   a first sensor coupled to the casing, the first sensor operable to receive light directly from the aperture and to generate a first data set in response to the received light;
   a first reflective surface coupled to the casing, the first reflective surface operable to receive light from the aperture and to reflect the received light;
   a second reflective surface coupled to the first reflective surface, the second reflective surface operable to receive light reflected from the first reflective surface and to reflect the received light; and
   a second sensor coupled to the second reflective surface, the second sensor operable to receive light reflected from the second reflective surface and to generate a second data set in response to the received light, the second sensor substantially coaxial with the first sensor.

2. The system of claim 1, wherein the first sensor comprises an infrared sensor.

3. The system of claim 1, wherein the second sensor comprises an image intensifier sensor.

4. The system of claim 1, wherein the first reflective surface has a diameter greater than a diameter of the second reflective surface.

5. The system of claim 1, wherein the first reflective surface has a diameter in the range of eight to ten centimeters and has a focal length in the range of twenty-four to twenty-six millimeters.

6. The system of claim 1, wherein the second reflective surface has a diameter in the range of seven to ten centimeters and has a focal length in the range of twenty-four to twenty-six millimeters.

7. The system of claim 1, further comprising optics coupled to the first sensor and operable to focus light from the aperture onto the first sensor.

8. The system of claim 1, further comprising a fusing module coupled to the first sensor and to the second sensor and operable to:
   receive the first data set and the second data set; and
   fuse the first data set and the second data set to generate a fused data set.

9. The system of claim 8, further comprising a display coupled to the fusing module and operable to:
   receive the fused data set; and
   display an image generated from the fused data set.

10. A method for gathering image data, the method comprising:
    receiving light directly through an aperture;
    generating a first data set in response to the light received through the aperture using a first sensor;
    reflecting the light received through the aperture using a first reflective surface;
    reflecting light received from the first reflective surface using a second reflective surface;
    receiving light reflected from the second reflective surface using a second sensor, the second sensor substantially coaxial with the first sensor;

generating a second data set in response to the received light using the second sensor.

11. The method of claim 10, wherein the first sensor comprises an infrared sensor.

12. The method of claim 10, wherein the second sensor comprises an image intensifier sensor.

13. The method of claim 10, wherein the first reflective surface has a diameter greater than a diameter of the second reflective surface.

14. The method of claim 10, wherein the first reflective surface has a diameter in the range of eight to ten centimeters and has a focal length in the range of twenty-four to twenty-six millimeters.

15. The method of claim 10, wherein the second reflective surface has a diameter in the range of seven to ten centimeters and has a focal length in the range of twenty-four to twenty-six millimeters.

16. The method of claim 10, further comprising focusing light from the aperture onto the first sensor using optics.

17. The method of claim 10, further comprising:
   receiving the first data set and the second data set; and
   fusing the first data set and the second data set to generate a fused data set.

18. The method of claim 17, further comprising:
   receiving the fused data set; and
   displaying an image generated from the fused data set.

19. A system for gathering image data, the system comprising:
   a casing having an aperture;
   an inner sensor coupled to the casing, the inner sensor operable to receive light directly from the aperture and to generate a first data set in response to the received light;
   a plurality of outer assemblies coupled to the casing, each outer assembly comprising:
      a first reflective surface operable to receive light directly from the aperture and to reflect the received light;
      a second reflective surface coupled to the first reflective surface, the second reflective surface operable to receive light reflected from the first reflective surface and to reflect the received light; and
      an outer sensor coupled to the second reflective surface, the outer sensor operable to receive light reflected from the second reflective surface and to generate a second data set in response to the received light, the outer sensor substantially coaxial with the inner sensor.

20. The system of claim 19, wherein the inner sensor comprises an infrared sensor.

21. The system of claim 19, wherein at least one outer sensor comprises an image intensifier sensor.

22. The system of claim 19, wherein the first reflective surface has a diameter greater than a diameter of the second reflective surface.

23. The system of claim 19, further comprising optics coupled to the inner sensor and operable to focus light from the aperture onto the inner sensor.

24. The system of claim 19, further comprising a fusing module coupled to the inner sensor and to the outer sensors and operable to:
   receive the first data set and the second data sets; and
   fuse the first data set and the second data sets to generate a fused data set.

25. The system of claim 24, further comprising a display coupled to the fusing module and operable to:
   receive the fused data set; and
   display an image generated from the fused data set.

* * * * *